May 13, 1941.    G. H. EGLING    2,241,395
SLITTING MACHINE
Filed Dec. 6, 1938    2 Sheets-Sheet 1
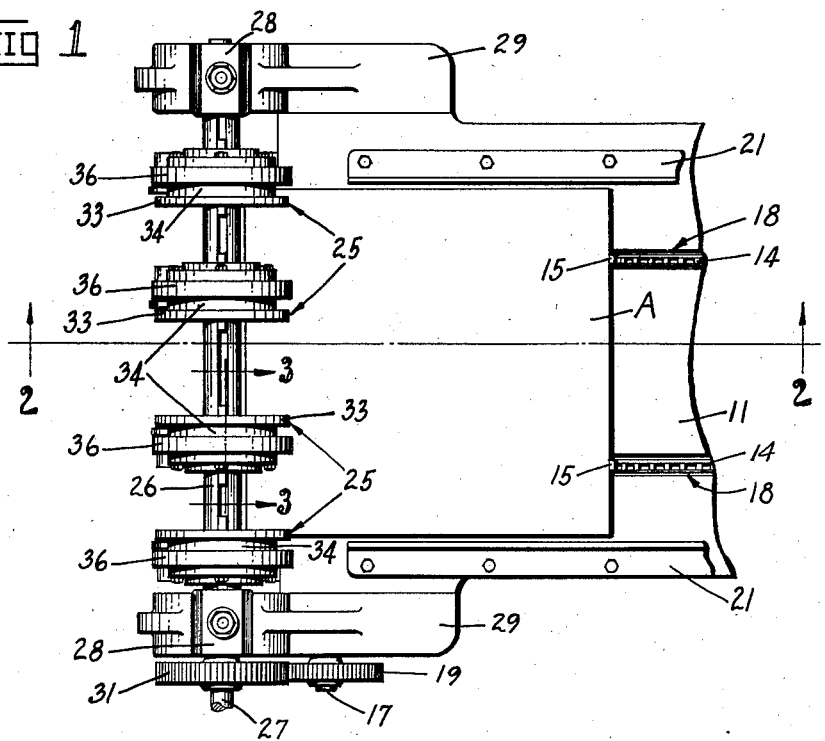
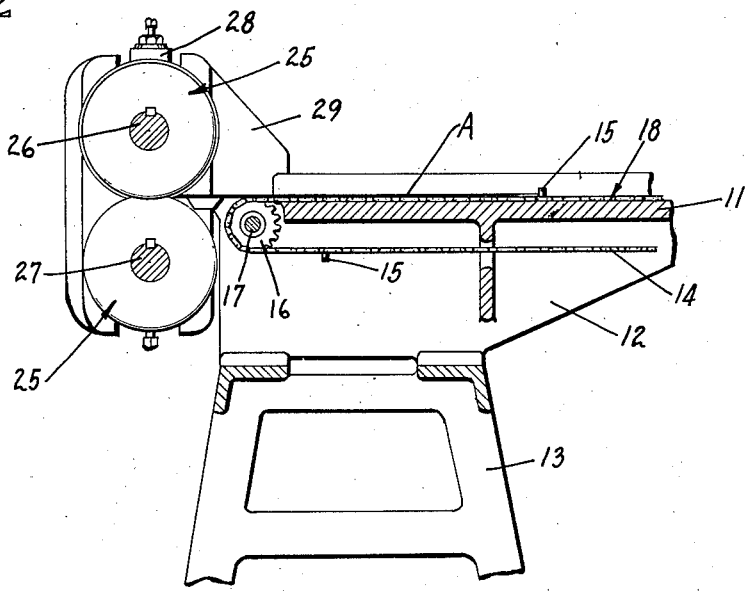
INVENTOR.
George H. Egling
BY
ATTORNEYS

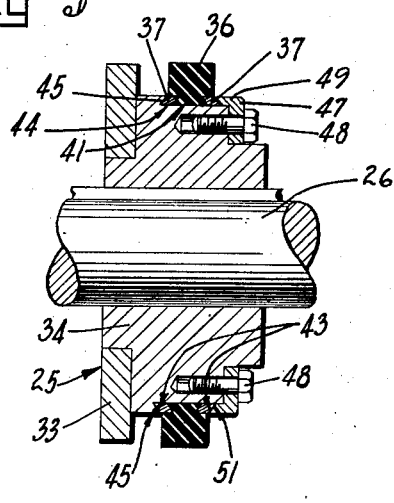
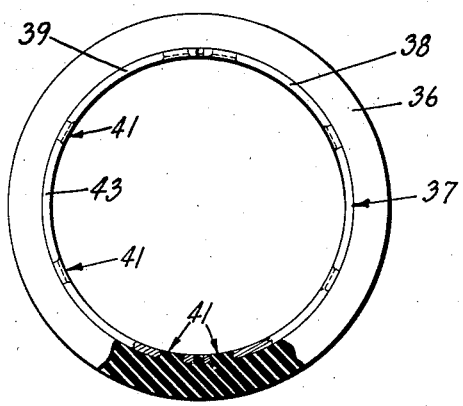
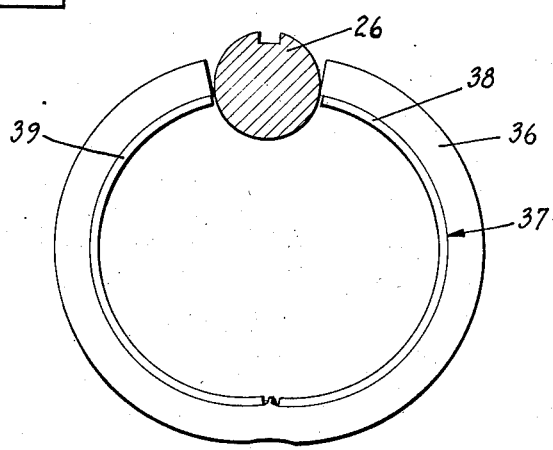

Patented May 13, 1941

2,241,395

UNITED STATES PATENT OFFICE 2,241,395

SLITTING MACHINE

George H. Egling, San Jose, Calif., assignor to American Can Company, New York, N. Y., a corporation of New Jersey Application December 6, 1938, Serial No. 244,285

8 Claims. (Cl. 164—61)

The present invention relates to a slitting machine used for cutting or slitting sheet material or the like and has particular reference to an improved type of rubber feed ring, usually called "slitter rubber," which may be inserted in place without removing the cutter shaft from its bearings in the machine and which may be locked against shifting after being inserted over the shaft.

In general, slitting machines are constructed with a pair of parallel cutter shafts carrying rotary cutter rollers between which is passed the sheet material to be slit or cut. During passage of the material between the rollers the sheet is preferably advanced or fed by slitter rubbers which are mounted on the cutter rollers adjacent the cutter knives. In slitting machines used in the can making industry, the sheet material slit is usually tin plate which is a hard surface material and which consequently subjects the slitter rubbers to severe wear. Under such wear the rubbers are continually breaking down or stretching and therefore considerable difficulty has been experienced with rubbers becoming loose and slipping and thus failing to properly feed the sheets. The present invention contemplates overcoming this difficulty by the use of an improved slitter rubber which comprises a rubber element vulcanized to a metal ring and which is clamped in place on the slitter cutter rollers so that the slitter rubber cannot shift.

An object of the invention therefore, is the provision in a slitting machine of a sheet feeding slitter rubber which is molded onto and vulcanized to a metal base ring adapted to be clamped and locked in place on the rotary cutter roller of the machine in a manner that prevents the rubber from breaking down and stretching or coming loose thereby nullifying its usefulness.

Another object is the provision of a feeding slitter rubber unit of the character described wherein the metal base ring is split into two sections so that the rubber element may be cut through and the ring opened up in order to slip it over the cutter shaft while the latter is still in its bearings in the machine, thereby permitting quick insertion of a new rubber into place on the shaft without disassembling any parts of the machine.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a slitting machine embodying the instant invention, parts being broken away;

Fig. 2 is a longitudinal section taken substantially along the line 2—2 in Fig. 1, with parts broken away;

Fig. 3 is an enlarged section of a cutter unit, the view being taken substantially along the transverse line 3—3 in Fig. 1;

Fig. 4 is an enlarged side elevation of one of the feed rubber units, with parts broken back; and Fig. 5 is a view similar to Fig. 4 showing the rubber cut through and the metal ring open and illustrating how the unit may be slipped over the cutter shaft of the machine for insertion into its proper place.

As a preferred embodiment of the invention the drawings illustrate the principal parts of a sheet slitting machine adapted to slit or cut a sheet A such for example of tin plate. The sheet A when brought into the machine is preferably supported in a horizontal position on a table portion 11 (Figs. 1 and 2) of a frame 12 carried on legs 13. The sheet may be fed or advanced along the table by a pair of endless chain conveyors 14 having spaced feed dogs 15 secured thereto.

The conveyor chains 14 take over sprockets 16 mounted on a cross shaft 17 carried in suitable bearings formed in the frame 12, the upper run of the chains operating in grooves 18 formed in the top of the table 11. Shaft 17 is rotated in any suitable manner as by a gear 19 mounted on an outer end thereof and driven in time with the other moving parts of the machine. Guide plates 21 mounted on top of the table and on either side of the chains 14 maintain the sheet in a straight line path of travel as it is propelled along the table top.

While on the table a fed sheet A passes into a slitting mechanism which effects the cutting or slitting of the sheet. This mechanism is located adjacent the discharge end of the table and includes a plurality of upper and lower rotary cutters or rollers 25 between which the sheet moves during cutting. In the drawings the cutters are shown as being spaced to cut can bodies from the sheet.

The cutters 25 are mounted on respective upper and lower cutter shafts 26, 27 which are journaled in bearing blocks 28 adjustably carried in side brackets 29 secured to opposite sides of the frame 12. The shafts are rotated in unison by meshing gears 31 which are carried on the outer ends of the shafts at one side of the machine. The lower shaft 27 is the main driving shaft of the machine and is rotated in any suitable manner from a main source of power. The lower gear 31 also meshes with the conveyor shaft gear 19 and hence drives the conveyor chains.

Each cutter 25 is preferably made in two parts, a hardened annular cutter knife 33 which actually does the cutting and a roller body or hub member 34 on which the cutter knife is fastened as shown in Fig. 3. It is this hub member which is mounted on and keyed to the cutter shafts 26, 27.

The cutters are preferably rotated at a faster rate of speed than the lineal travel of the conveyor chains 14 and an upper cutter knife engages in shearing position against a lower cutter knife in the conventional manner. When a sheet is caught between the cutters it is drawn away quickly from the conveyor dogs 15. The feeding of the sheet once it is caught by the cutters is effected by slitter rubbers or feed rings 36 which are preferably mounted on the cutter hubs 34 and which grip the sheet on both surfaces and propel it between the cutters. It is to an improved slitter rubber that the invention is particularly directed.

Each of the rubbers 36 is preferably rectangular in cross section and is formed on a metal base ring 37 (see Figs. 3, 4 and 5) which is split in two half sections 38, 39. When made, the rubber 36 is molded onto the metal ring 37 as a continuous ring, the rubber being imbedded into spaced holes 41 formed in the metal ring, and then vulcanized in place so that rubber and metal are for all practical purposes one unit.

The metal ring 37 is provided with beveled edges 43 and is adapted to fit snugly over a reduced diameter seat 44 formed on the cutter hub member 34. The inner edge of the seat is provided with an under-cut bevel 45 for the reception of the inner beveled edge of the ring. The ring is clamped fast to the hub when in this seated position by a clamping annulus 47 which is secured by bolts 48 to the outer face of the hub member 34.

The clamping annulus is formed with an annular right angle flange 49 which surrounds the hub seat 44 and this flange has an under-cut beveled edge 51 corresponding with and engaging against the outer beveled edge of the metal ring of the slitter rubber when the clamping annulus is in place on the hub. Hence by tightly drawing the bolts 48 down on the annulus the latter holds the slitter rubber in a vise-like grip on its hub seat 44.

This construction of slitter rubber and clamping annulus prevents stretching or rolling of the rubber element and also prevents shifting or slipping. The life of the slitter rubber is thereby greatly lengthened.

When a complete set of slitter rubbers is required in the machine, the cutter shafts 26, 27 are taken out of one or more of their bearings and the cutters are removed in the conventional way. It is then a simple matter to slip the rubber units for each cutter onto its seat 44 in the cutter hub member and assemble the clamping annulus in place to hold it.

However, with the improved slitter rubbers of the present invention it is also possible to quickly insert a new rubber in place without removing the cutter or disturbing the shaft. This is effected by cutting through the rubber 36 at one of the splits in the metal ring 37. The ring may then be opened or spread apart without distorting or damaging the rubber in any respect. The opened ring is then readily slipped over or around the cutter shaft, as shown in Fig. 5, after which its separated ends are brought together, the unit closed and locked in position on its hub seat 44 by the clamping annulus 47.

The dovetail locking feature of the beveled edges holds the split ring in place just as tightly and securely as an uncut ring and in fact more rigid than an all rubber element without a reenforcing metal ring. The split in the rubber has no detrimental effects on its feeding functions or on its long life. The many important advantages of the improved slitter rubber will now be evident and not the least of these is the replacement feature as when only one new rubber is required in the machine, this can be inserted quickly without having the machine shut down for a long wasteful costly period of time.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for slitting or cutting sheet material, the combination of a rotatable cutter shaft, a rotary cutter having a hub mounted on said shaft, a sheet feeding rubber on said cutter hub, said rubber comprising an annular base ring having beveled edges and an annular rubber ring molded on and vulcanized to said base ring, an annular seat on said hub to receive said base ring, an under-cut bevel in the edge of said seat to receive one edge of said base ring, and a clamping annulus adapted to be secured to said hub and having an under-cut beveled edge for engagement with a beveled edge on said base ring to clamp said base ring and its connected rubber in place on said cutter hub seat.

2. In a machine for slitting or cutting sheet material, the combination of rotatable cutter shafts, rotary cutters each having a hub mounted on said shafts, a sheet feeding slitter rubber on each cutter hub, said slitter rubber comprising an annular base ring split in two parts and a continuous annular rubber ring molded on and vulcanized to said base ring in a unitary structure which is adapted to be cut through at one of the splits between the base ring parts so that the ring may be opened for insertion of said slitter rubber around the hub of a said cutter, and a clamping annulus secured to each of said hubs for holding said sheet feeding slitter rubbers against shifting relative to said cutter hubs.

3. A sheet feeding rubber for a slitting machine, comprising a hub member adapted to be removably secured to a rotatable cutter shaft of the slitting machine, said hub member having a peripheral seat, a split base ring formed of rigid material mounted on said hub member seat, a one-piece rubber ring molded on and vulcanized to said split base ring to provide a unitary sheet feeding structure for use in said slitting machine, and an annular clamping member having a flange portion engageable with said base ring for removably clamping said base ring against said hub member seat.

4. A sheet feeding rubber for use in a slitting machine, comprising a hub member adapted to be removably secured to a rotatable cutter shaft of the slitting machine, said hub member having a peripheral seat, a split metal base ring having spaced apertures therein carried by said hub member seat, a one-piece rubber ring molded on said base ring and having portions thereof projecting within said apertures and also vulcanized on said base to provide an integral sheet feeding slitter rubber for use in said slitting machine, and an annular clamping member having a flange portion engageable with said base ring for removably clamping said base ring on and against said hub member.

5. A sheet feeding rubber for use on a cutter shaft of a slitting machine, comprising a hub member adapted to be removably secured to a rotatable cutter shaft of the slitting machine, said hub member having a peripheral seat, a rigid metal base ring split into half sections mounted on said hub member seat, a continuous unitary annular rubber ring surrounding said base half sections of said base ring when assembled into an annulus thereon, said rubber ring being molded on and vulcanized to said base sections thereby producing a unitary sheet feeding structure which may be cut through at a split in said base ring and inserted around and secured in place on the cutter shaft while said shaft is in the machine, and an annular clamping member adapted to be removably secured to said hub member and having a peripheral flange portion engageable with said base ring sections for removably clamping the latter rigidly in position against the peripheral seat of said hub member.

6. In a machine for slitting or cutting sheet material, the combination of a rotatable cutter shaft, a hub member rigidly mounted thereon and having a peripheral walled seat, a split base ring mounted on said hub member and disposed within said seat, a rotating cutter on said hub member for slitting the sheet material, a rubber ring mounted on and carried by said base ring adjacent said cutter for propelling the sheet material past said cutter, and an annular clamping member having a laterally extending peripheral flange portion engageable with said base ring for clamping the latter against said hub member seat to prevent shifting and rolling of said ring relative to said cutter while propelling the sheet material.

7. In a machine for slitting or cutting sheet material, the combination of a rotatable cutter shaft, a hub member rigidly mounted thereon and having a peripheral walled seat, a split base ring mounted on said hub member and disposed within said seat, said base ring having spaced apertures therein, a rotary cutter having a hub mounted on said shaft for slitting said sheet material, a rubber ring mounted on and vulcanized to said base ring adjacent said cutter for propelling the sheet material past the latter, portions of said rubber ring projecting into said apertures of the base ring to constitute a non-slipping interlocking union, and a clamping annulus securable to said cutter hub and having an inwardly extending peripheral flange portion engageable with said base ring for removably clamping said ring against said seat, whereby to prevent shifting and rolling of said ring relative to said cutter while propelling the sheet material.

8. In a machine for slitting or cutting sheet material, the combination of a rotatable cutter shaft, a rotary cutter having a hub portion mounted on said shaft, a sheet feeding slitter rubber on said cutter hub portion, said slitter rubber comprising an annular base ring split in two parts and a continuous annular rubber ring carried by and secured to said base ring in a unitary structure which is adapted to be cut through at one of the splits between the base ring parts so that the ring may be opened for insertion of said slitter rubber around the hub portion of said cutter, and a clamping annulus secured to said hub portion for holding said sheet feeding slitter rubber against shifting relative to said cutter hub portion.

GEORGE H. EGLING.